(12) United States Patent
Watson (10) Patent No.: US 11,588,339 B2
(45) Date of Patent: Feb. 21, 2023

(54) COMBINATION CHARGING CABLE AND HAIR TIE ASSEMBLY

(71) Applicant: Jason Watson, Buffalo, NY (US)

(72) Inventor: Jason Watson, Buffalo, NY (US)

(*) Notice: Subject to any disclaimer, the term of this patent is extended or adjusted under 35 U.S.C. 154(b) by 282 days.

(21) Appl. No.: 17/166,401

(22) Filed: Feb. 3, 2021

(65) Prior Publication Data

US 2022/0247193 A1    Aug. 4, 2022

(51) Int. Cl.
*H02J 7/00* (2006.01)
*H01R 27/02* (2006.01)
*A45D 8/36* (2006.01)
*A45D 8/34* (2006.01)

(52) U.S. Cl.
CPC ............ *H02J 7/0045* (2013.01); *H01R 27/02* (2013.01); *H02J 7/0042* (2013.01); *A45D 8/34* (2013.01); *A45D 8/36* (2013.01)

(58) Field of Classification Search
CPC ...... H02J 7/0045; H02J 7/0042; H01R 27/02; A45D 8/34; A45D 8/36
USPC .................. 320/107, 114; 439/502
See application file for complete search history.

(56) References Cited

U.S. PATENT DOCUMENTS

| 8,029,302 | B1 | 10/2011 | Duan |
| 9,553,475 | B2 | 1/2017 | Boysen, III |
| D833,072 | S | 11/2018 | Zhang |
| 2008/0188124 | A1* | 8/2008 | Kim ...................... H01R 24/58 439/581 |
| 2010/0267276 | A1 | 10/2010 | Wu |
| 2014/0091766 | A1 | 4/2014 | Ajagbe |
| 2014/0096778 | A1 | 4/2014 | Krasniansky |
| 2016/0087470 | A1 | 3/2016 | Lizama |
| 2018/0138728 | A1* | 5/2018 | Kefalos ................... H02N 2/18 |
| 2019/0305569 | A1* | 10/2019 | Miller ..................... A45F 5/021 |

FOREIGN PATENT DOCUMENTS

WO    WO20141723    10/2014

* cited by examiner

*Primary Examiner* — Edward Tso
*Assistant Examiner* — Aaron Piggush (57) ABSTRACT

A combination charging cable and hair tie assembly includes an elastic band that is comprised of a resiliently stretchable material for stretching around a user's hair in the manner of a hair tie. A plurality of conductors is each of the conductors is woven into the elastic band to elongate and shorten when the elastic band is stretched and released. A first charge plug is coupled to the elastic band to engage a charge port on an electronic device. A second charge plug is coupled to the elastic band and the second charge plug is matable to the first charge plug such that the elastic band forms a closed loop to serve as a hair tie. Additionally, the second charge plug can engage a charge port on an electronic device.

12 Claims, 7 Drawing Sheets

COMBINATION CHARGING CABLE AND HAIR TIE ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to charging cable devices and more particularly pertains to a new charging cable device combining a charging cable with an elastic hair tie. The device includes a plurality of conductors that are woven into an elastic band. Additionally, a pair of charge plugs is included, each with a pair of data ports, to facilitate a variety of electronic devices to be charged.

(2) Description of Related Art Including Information Disclosed Under 37 CFR 1.97 and 1.98

The prior art relates to charging cable devices including a variety of charge cords that are matable together to form a closed loop for wearing on a user. The prior art also discloses a charge cord that has a slidably adjustable length. In no instance does the prior art disclose an elastic band that has conductors woven therein to define a charge cord that can be stretched.

(h) BRIEF SUMMARY OF THE INVENTION

An embodiment of the disclosure meets the needs presented above by generally comprising an elastic band that is comprised of a resiliently stretchable material for stretching around a user's hair in the manner of a hair tie. A plurality of conductors is each of the conductors is woven into the elastic band to elongate and shorten when the elastic band is stretched and released. A first charge plug is coupled to the elastic band to engage a charge port on an electronic device. A second charge plug is coupled to the elastic band and the second charge plug is matable to the first charge plug such that the elastic band forms a closed loop to serve as a hair tie. Additionally, the second charge plug can engage a charge port on an electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

With reference now to the drawings, and in particular to FIGS. 1 through 8 thereof, a new charging cable device embodying the principles and concepts of an embodiment of the disclosure and generally designated by the reference numeral 10 will be described.

As best illustrated in FIGS. 1 through 8, the combination charging cable and hair tie assembly 10 generally comprises an elastic band 12 that is comprised of a resiliently stretchable material. In this way the elastic band 12 can be stretched around a user's hair in the manner of a hair tie. The elastic band 12 has a first end 14 and a second end 16, and the elastic band 12 may be stretchable to a maximum length of at least 6.0 inches. A plurality of conductors 18 is each woven into the elastic band 12 having the conductors 18 being arranged into a plurality of loops. In this way the conductors 18 can elongate and shorten when the elastic band 12 is stretched and released. Each of the conductors 18 extends between the first end 14 and the second end 16, and the plurality of conductors 18 includes a set of first conductors 20 and a set of second conductors 22.

A decorative sleeve 24 is provided and the elastic band 12 extends through the decorative sleeve 24. The decorative sleeve 24 has a length that is equal to the length of the elastic band 12 when the elastic band 12 is fully stretched. The decorative sleeve 24 may be available in a variety of colors and the decorative sleeve 24 may have ornamental indicia printed thereon. In this way the decorative sleeve 24 can enhance the ornamental appeal of the elastic band 12. The decorative sleeve 24 has a primary end 26 and a secondary end 28; the primary end 26 is aligned with the first end 14 of the elastic band 12 and the secondary end 28 is aligned with the second end 16 of the elastic band 12.

A first charge plug 30 is coupled to the elastic band 12 and a male port 32 is integrated into the first charge plug 30 to engage a charge port 34 on an electronic device 36. A female port 38 is integrated into the first charge plug 30 to engage a charge port 34 on an electronic device 36. The electronic device 36 may be a smart phone, a laptop computer or any other type of portable electronic device. The first charge plug 30 has a front end 40 and a back end 42, and the back end 42 is coupled to the first end 14 of the elastic band 12. The male port 32 extends away from the front end 40 and the female port 38 is recessed into the front end 40. Moreover, the male port 32 and the female port 38 are stacked on each other on the front end 40. The male port 32 is electrically coupled to the set of first conductors 20 and the female port 38 is electrically coupled to the set of second conductors 22. The male port 32 may comprise a usb port or the like and the female port 38 may comprise a micro usb port or other type of data port that is unique from the male data port 32.

A second charge plug 44 is provided and the second charge plug 44 is coupled to the elastic band 12. The second charge plug 44 is matable to the first charge plug 30 such that the elastic band 12 forms a closed loop. In this way the elastic band 12 can serve as a hair tie. A male port 46 is integrated into the second charge plug 44 and the male port 46 on the second charge plug 44 can engage a charge port 34 on an electronic device 36. A female port 48 is integrated into the second charge plug 44 and the female port 48 on the second charge plug 44 can engage a charge port 34 on an electronic device 36. The electronic device 36 may be a charger for the smart phone or laptop computer. In this way the first charge plug 30 and the second charge plug 44 facilitate a variety of different devices to be charged. The male port 46 on the second charge plug 44 may comprise a micro usb port or other type of port that is complementary to the female port 38 on the first charge plug 30. Additionally, the female port 48 on the second charge plug 44 may comprise a usb port or other type of port that is complementary to the male port 32 on the first charge plug 30.

The second charge plug 44 has a rear end 50 and a forward end 52, and the rear end 50 is coupled to the second end 16 of the elastic band 12. The male port 46 on the second charge plug 44 extends forwardly from the forward end 52 and the female port 48 on the second charge plug 44 is recessed into the forward end 52. The male port 46 on the second charge plug 44 is electrically coupled to the set of second conductors 22 such that the male port 46 on the second charge plug 44 is in electrical communication with the female port 38 on the first charge plug 30. The female port 48 on the second charge plug 44 is electrically coupled to the set of first conductors 20 such that the female port 48 on the second charge plug 44 is in electrical communication with the male port 32 on the first charge plug 30.

Figure 1:
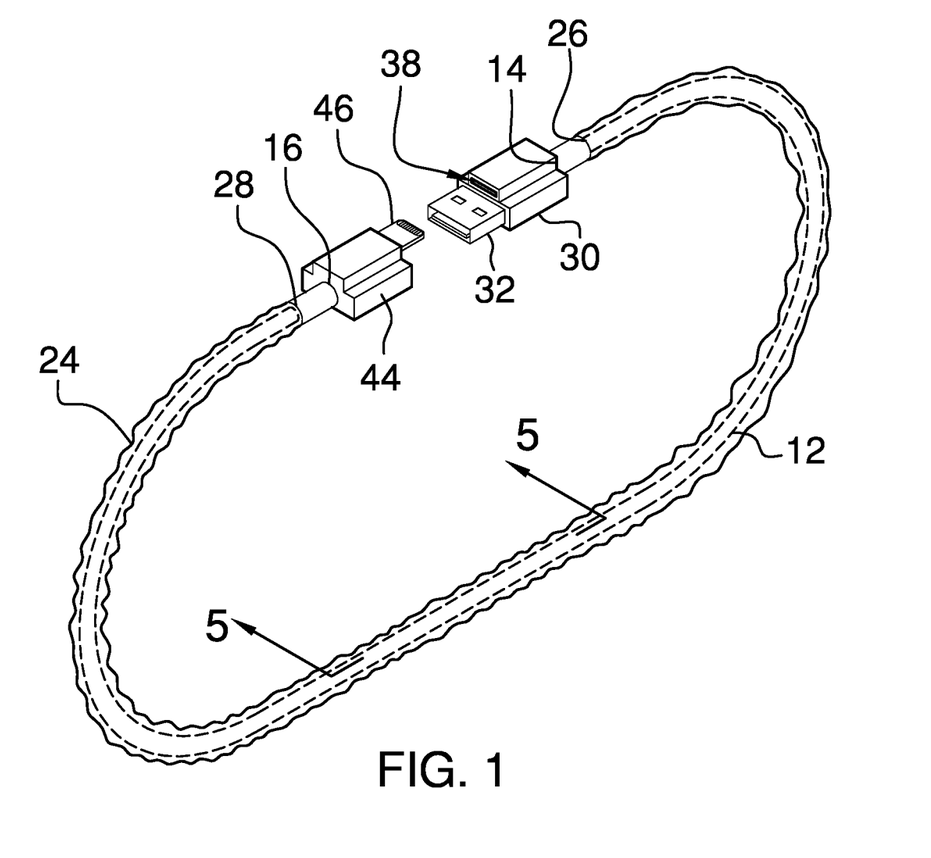
FIG. 1 is a perspective view of a combination charging cable and hair tie assembly according to an embodiment of the disclosure.
Figure 2:
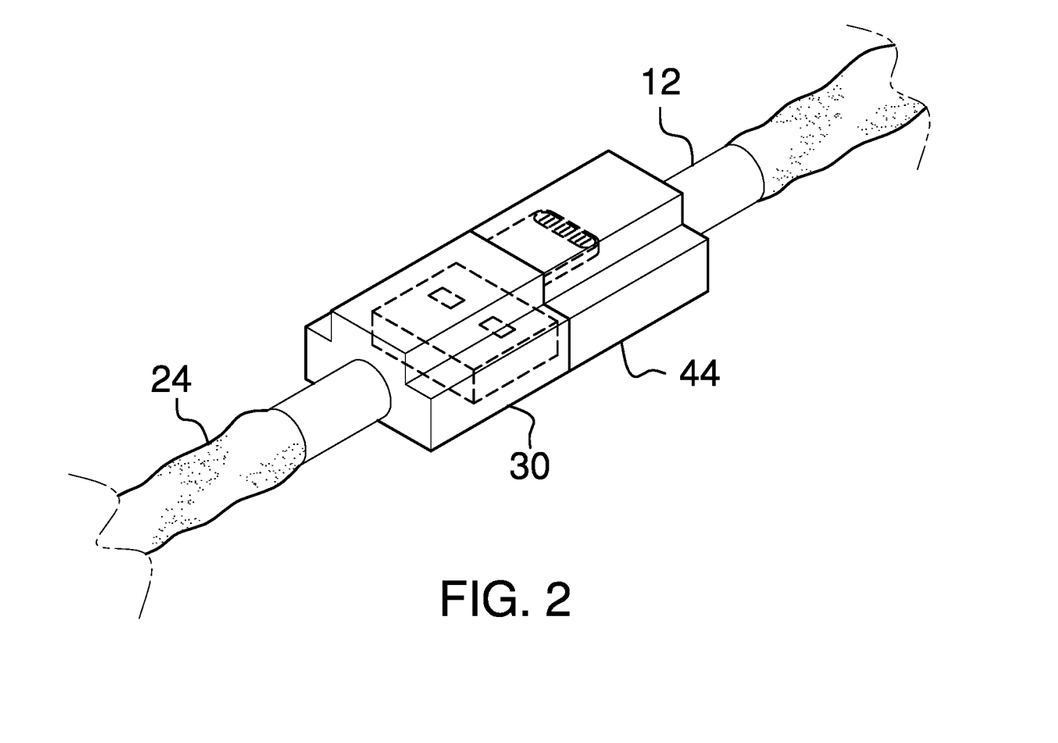
FIG. 2 is a phantom perspective view of an embodiment of the disclosure showing a first charge plug being mated to a second charge plug.
Figure 3:
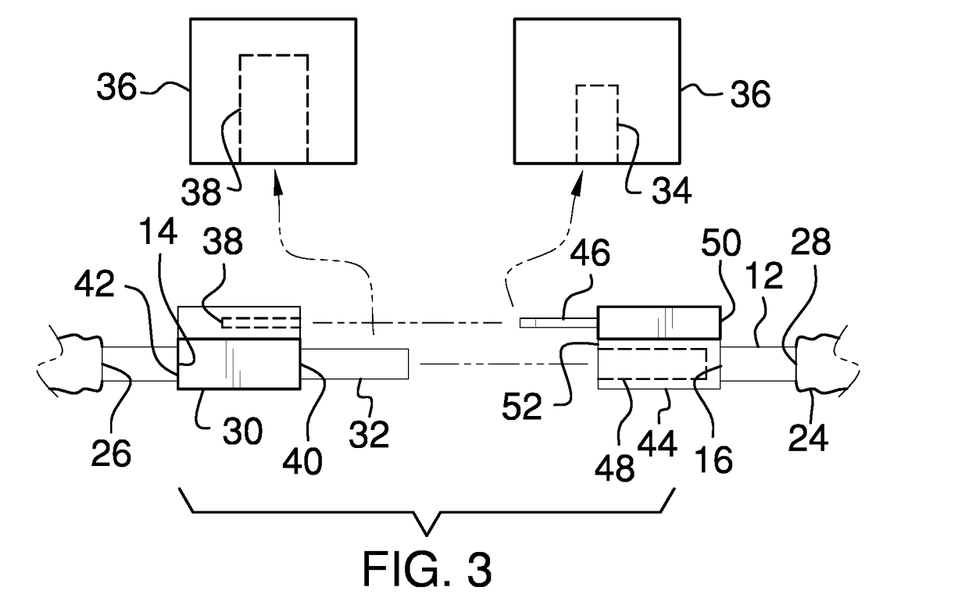
FIG. 3 is an exploded perspective view of an embodiment of the disclosure.
Figure 4:
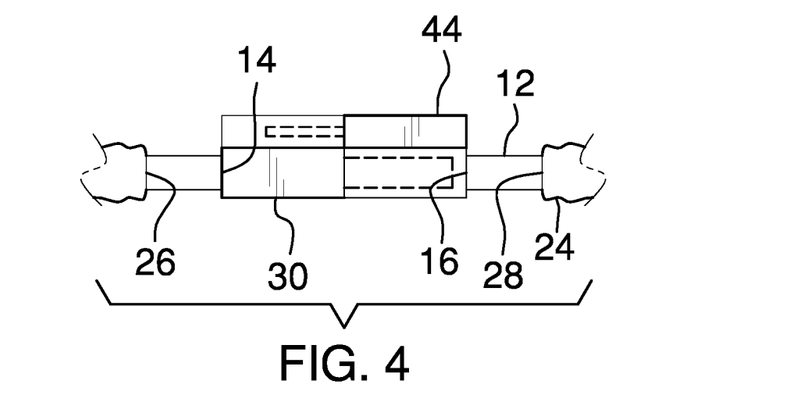
FIG. 4 is a right side phantom view of an embodiment of the disclosure showing a first charge plug being mated to a second charge plug.
Figure 5:
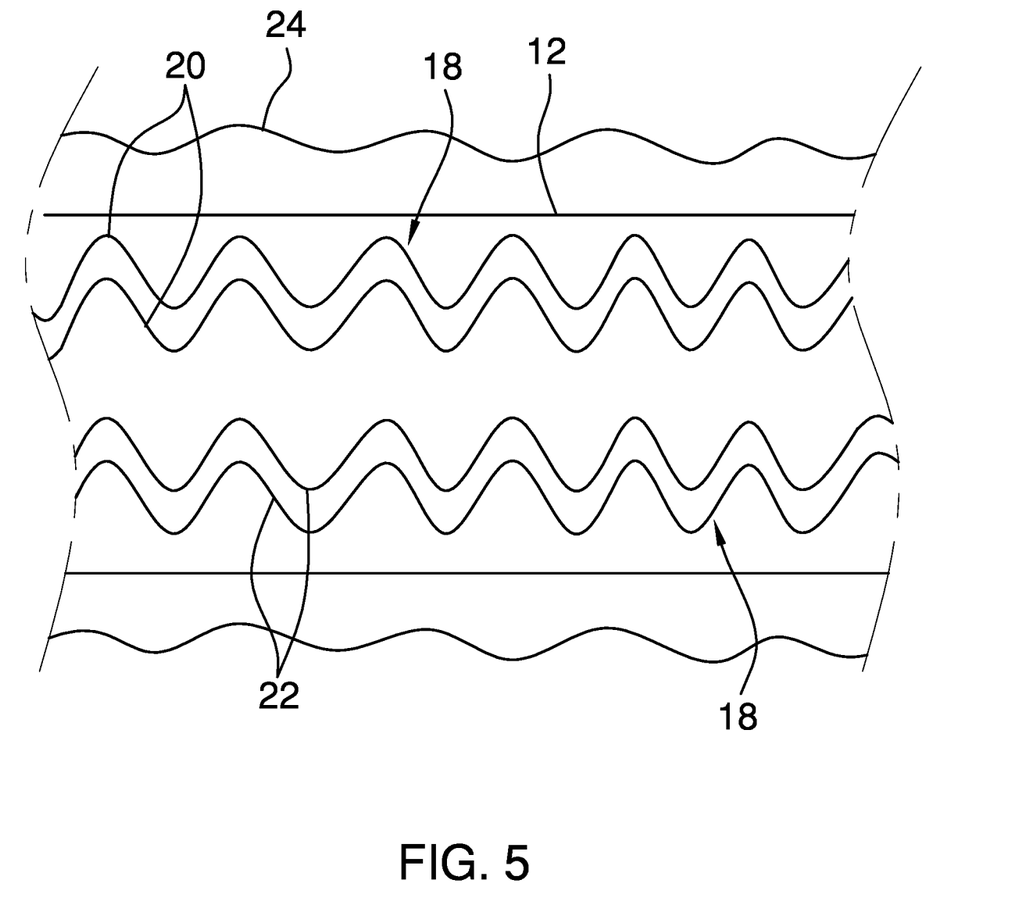
FIG. 5 is a phantom view of an embodiment of the disclosure showing a plurality of conductors woven into an elastic band.
Figure 6:
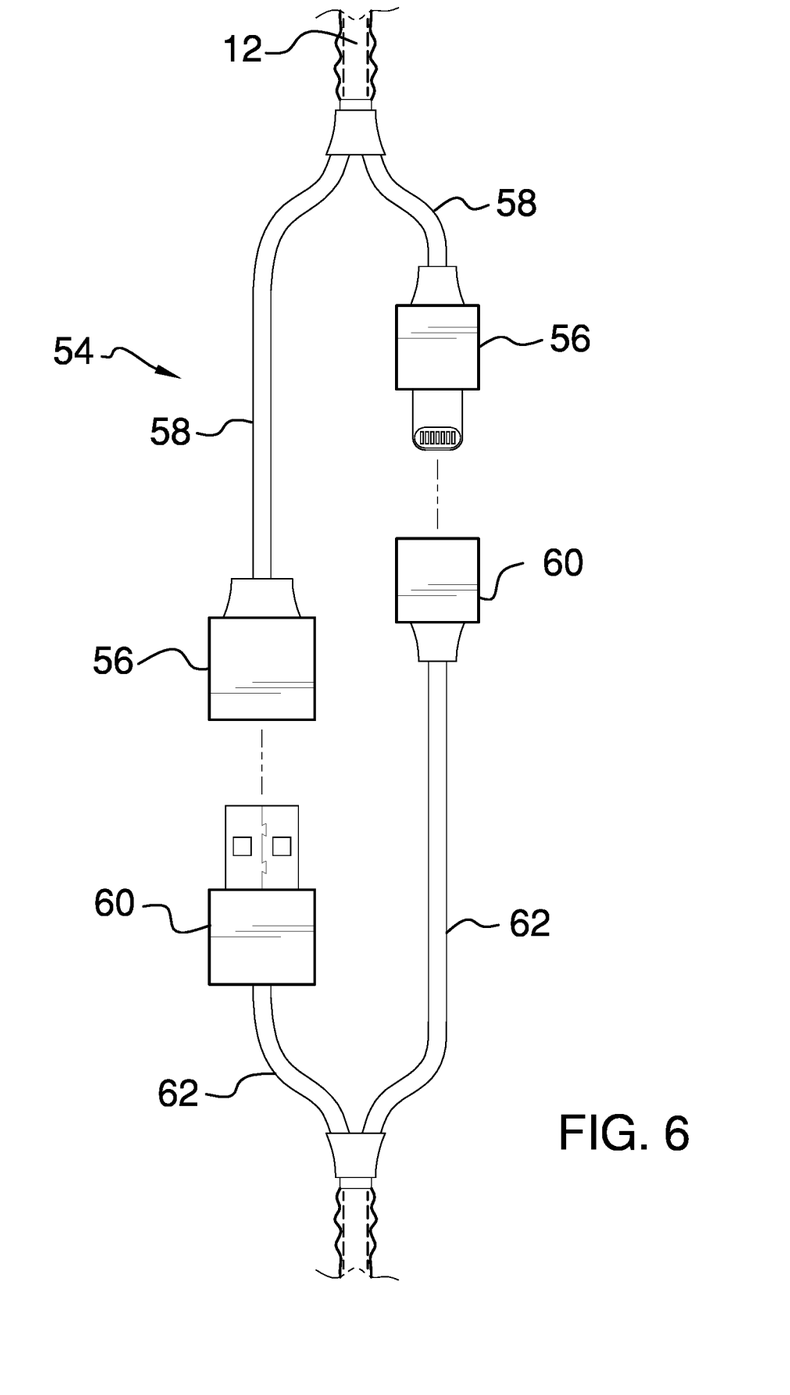
FIG. 6 is a perspective view of an alternative embodiment of the disclosure.
Figure 7:
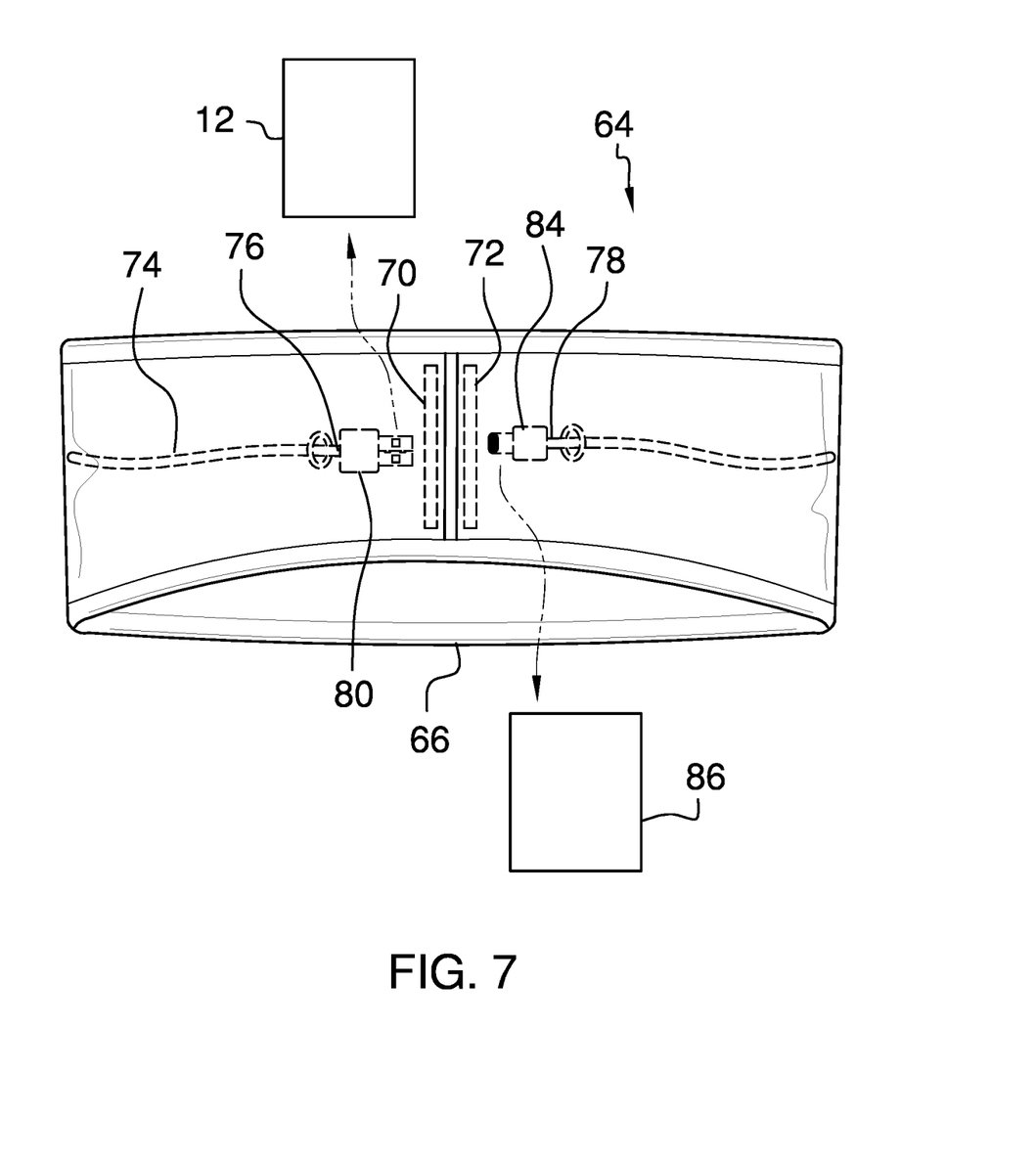
FIG. 7 is a front phantom view of an alternative embodiment of the disclosure.

In an alternative embodiment 54 as is most clearly shown in FIG. 6, a pair of first data plugs 56 is each coupled to the first end 14 of the elastic band 12 and each of the first data plugs 56 includes a conductor 58 that is coupled to the first end 14 of the elastic band 12. Moreover, the conductor 58 associated with each of the first data plugs 56 is electrically coupled to respective ones of the set of first conductors 20 and the set of second conductors 22. Continuing in the alternative embodiment 54, a pair of second data plugs 60 is each coupled to the second end 16 of the elastic band 12, and each of the second data plugs 60 includes a conductor 62 that is coupled to the second end 16 of the elastic band 12. The conductor 62 associated with each of the second data plugs 60 is electrically coupled to respective ones of the set of first conductors 20 and the set of second conductors 22. Additionally, each of the second data plugs 60 is matable to a respective one of the first data plugs 56.

Figure 8:
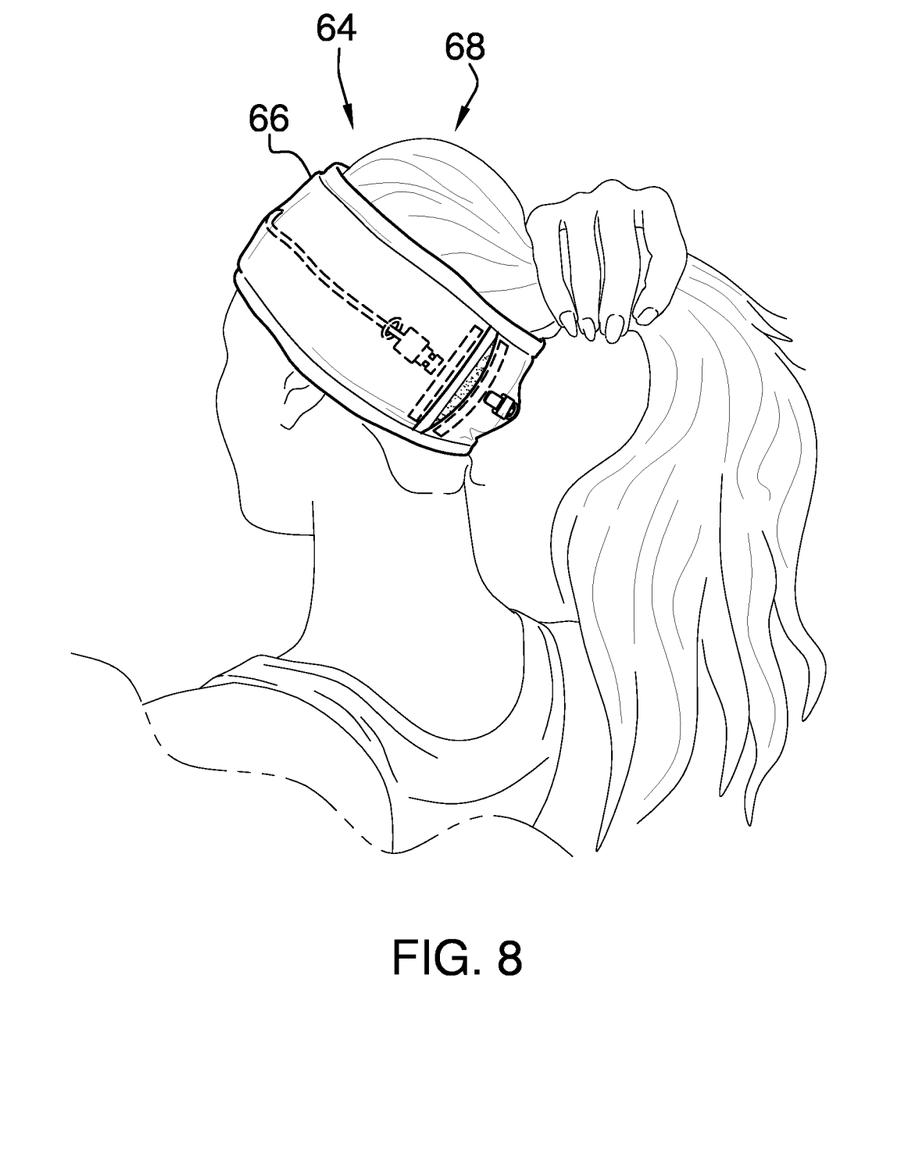
FIG. 8 is a perspective in-use view of an alternative embodiment of the disclosure.

In an alternative embodiment 64 as is most clearly shown in FIGS. 8 and 9, a belt 66 is provided that is continuous such that the belt 66 defines a closed loop thereby facilitating the belt 66 to be worn around a user's head 68. The belt 66 is hollow and the belt 66 has a first slot 70 extending into an interior of the belt 66. The belt 66 has a second slot 72 extending into the interior of the belt 66 and the second slot 72 is positioned adjacent to the first slot 70. Continuing in the alternative embodiment 64, a primary conductor 74 is provided that has a first end 76 and a second end 78. The primary conductor 74 is positioned within the belt 66, and each of the first end 76 and the second end 78 is aligned with a respective one of the first slot 70 and the second slot 72.

Continuing in the alternative embodiment 64, a first plug 80 is electrically coupled to the first end 76 of the primary conductor 74 and the first plug 80 can be plugged into a first electronic device 82. A second plug 84 is electrically coupled to the second end 78 of the primary conductor 74 and the second plug 84 can be plugged into a second electronic device 86. In this way the first electronic device 82 is in electrical communication with the second electronic device 86.

In use, the first charge plug 30 is mated to the second charge plug 44 to form the elastic band 12 into a closed loop. In this way the elastic band 12 can function in the manner of a hair tie for tying the user's hair in a preferred hair style. The first charge plug 30 and the second charge plug 44 are unmated from each other to employ the elastic band 12 in the manner of a charging cord. Respective ones of the male port or the female port on the first charge plug 30 are plugged into an electronic device, depending upon the type of charge port in the electronic device. Additionally, respective ones of the male port or the female port on the second charge plug 44 are plugged into the charger, depending on the type of charge port in the charger. In this way a variety of different electronic devices can be charged with the elastic band 12 and the first charge plug 30 and second charge plug 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination charging cable and hair tie assembly for tying up a user's hair or charging an electronic device, said assembly comprising:
   an elastic band being comprised of a resiliently stretchable material wherein said elastic band is configured to be stretched around a user's hair in the manner of a hair tie;
   a plurality of conductors, each of said conductors being woven into said elastic band having said conductors being arranged into a plurality of loops thereby facilitating said conductors to elongate and shorten when said elastic band is stretched and released;
   a decorative sleeve having said elastic band extending therethrough, said decorative sleeve having a length being equal to the length of said elastic band when said elastic band is fully stretched;
   a first charge plug being coupled to said elastic band, said first charge plug having a male port being integrated therein wherein said male port is configured to engage a charge port on an electronic device, said first charge plug having a female port being integrated therein wherein said female port is configured to engage a charge port on an electronic device; and
   a second charge plug being coupled to said elastic band, said second charge plug being matable to said first charge plug such that said elastic band forms a closed loop wherein said elastic band is configured to serve as a hair tie, said second charge plug having a male port being integrated therein
      wherein said male port on said second charge plug is configured to engage a charge port on an electronic device, said second charge plug having a female port being integrated therein wherein said female port on said second charge plug is configured to engage a charge port on an electronic device, said male port on said first charge plug being in communication with said female port on said second charge plug, said female port on said first charge plug being in communication with said male port on said second charge plug.

2. The assembly according to claim 1, wherein:
   said elastic band has a first end and a second end; and
   said decorative sleeve has a primary end and a secondary end, said primary end being aligned with said first end of said elastic band, said secondary end being aligned with said second end of said elastic band.

3. The assembly according to claim 2, wherein said first charge plug has a front end and a back end, said back end being coupled to said first end of said elastic band, said male port extending away from said front end, said female port being recessed into said front end, said male port and said female port being stacked on each other on said front end.

4. The assembly according to claim 3, wherein:
   each of said conductors extends between said first end and said second end of said elastic band, said plurality of conductors including a set of first conductors and a set of second conductors; and
   said male port is electrically coupled to said set of first conductors, said female port being electrically coupled to said set of second conductors.

5. The assembly according to claim 2, wherein said second charge plug has a rear end and a forward end, said rear end being coupled to said second end of said elastic band, said male port on said second charge plug extending forwardly from said forward end, said female port on said second charge plug being recessed into said forward end.

6. The assembly according to claim 5, wherein:
   each of said conductors extends between said first end and said second end of said elastic band, said plurality of conductors including a set of first conductors and a set of second conductors;
   said male port on said first charge plug is electrically coupled to said set of first conductors, said female port on said first charge plug is electrically coupled to said set of second conductors; and
   said male port on said second charge plug is electrically coupled to said set of second conductors such that said male port on said second charge plug is in electrical communication with said female port on said first charge plug, said female port on said second charge plug being electrically coupled to said set of first conductors such that said female port on said second charge plug is in electrical communication with said male port on said first charge plug.

7. A combination charging cable and hair tie assembly for tying up a user's hair or charging an electronic device, said assembly comprising:
   an elastic band being comprised of a resiliently stretchable material wherein said elastic band is configured to be stretched around a user's hair in the manner of a hair tie, said elastic band having a first end and a second end;
   a plurality of conductors, each of said conductors being woven into said elastic band having said conductors being arranged into a plurality of loops thereby facilitating said conductors to elongate and shorten when said elastic band is stretched and released, each of said conductors extending between said first end and said second end, said plurality of conductors including a set of first conductors and a set of second conductors;
   a decorative sleeve having said elastic band extending therethrough, said decorative sleeve having a length being equal to the length of said elastic band when said elastic band is fully stretched, said decorative sleeve having a primary end and a secondary end, said primary end being aligned with said first end of said elastic band, said secondary end being aligned with said second end of said elastic band;
   a first charge plug being coupled to said elastic band, said first charge plug having a male port being integrated therein wherein said male port is configured to engage a charge port on an electronic device, said first charge plug having a female port being integrated therein wherein said female port is configured to engage a charge port on an electronic device, said first charge plug having a front end and a back end, said back end being coupled to said first end of said elastic band, said male port extending away from said front end, said female port being recessed into said front end, said male port and said female port being stacked on each other on said front end, said male port being electrically coupled to said set of first conductors, said female port being electrically coupled to said set of second conductors; and a second charge plug being coupled to said elastic band, said second charge plug being matable to said first charge plug such that said elastic band forms a closed loop wherein said elastic band is configured to serve as a hair tie, said second charge plug having a male port being integrated therein wherein said male port on said second charge plug is configured to engage a charge port on an electronic device, said second charge plug having a female port being integrated therein wherein said female port on said second charge plug is configured to engage a charge port on an electronic device, said second charge plug having a rear end and a forward end, said rear end being coupled to said second end of said elastic band, said male port on said second charge plug extending forwardly from said forward end, said female port on said second charge plug being recessed into said forward end, said male port on said second charge plug being electrically coupled to said set of second conductors such that said male port on said second charge plug is in electrical communication with said female port on said first charge plug, said female port on said second charge plug being electrically coupled to said set of first conductors such that said female port on said second charge plug is in electrical communication with said male port on said first charge plug.

8. The assembly according to claim 7, further comprising a pair of first data plugs, each of said first data plugs being coupled to said first end of said elastic band, each of said first data plugs including a conductor being coupled to said first end of said elastic band, said conductor associated with each of said first data plugs being electrically coupled to respective ones of said set of first conductors and said set of second conductors.

9. The assembly according to claim 8, further comprising a pair of second data plugs, each of said second data plugs being coupled to said second end of said elastic band, each of said second data plugs including a conductor being coupled to said second end of said elastic band, said conductor associated with each of said second data plugs being electrically coupled to respective ones of said set of first conductors and said set of second conductors, each of said second data plugs being matable to a respective one of said first data plugs.

10. The assembly according to claim 7, further comprising a belt being continuous such that said belt defines a closed loop wherein said belt is configured to be worn around a user's head, said belt being hollow, said belt having a first slot extending into an interior of said belt, said belt having a second slot extending into said interior of said belt, said second slot being positioned adjacent to said first slot.

11. The assembly according to claim 10, further comprising a primary conductor having a first end and a second end, said primary conductor being positioned within said belt, each of said first end and said second end being aligned with a respective one of said first slot and said second slot.

12. The assembly according to claim 11, further comprising:
 a first plug being electrically coupled to said first end of said primary conductor wherein said first plug is configured to be plugged into a first electronic device; and
 a second plug being electrically coupled to said second end of said primary conductor wherein said second plug is configured to be plugged into a second electronic device thereby facilitating electrical communication between the first electronic device and the second electronic device.

* * * * *